United States Patent [19]

Levin et al.

[11] 4,302,676
[45] Nov. 24, 1981

[54] ISOTOPE SEPARATION

[76] Inventors: Menahm Levin, 75 Herzl St., Ramat Gan; Isaiah Nebenzahl, 10a Nachshon St., Haifa, both of Israel

[21] Appl. No.: 341,567

[22] Filed: Mar. 15, 1973

[30] Foreign Application Priority Data

Mar. 19, 1972 [IL]  Israel .................................. 39023

[51] Int. Cl.$^3$ ........................................... A01J 39/34
[52] U.S. Cl. ................................. 250/423 P; 250/282; 423/2
[58] Field of Search ................... 250/423 P, 281, 282; 423/2; 204/DIG. 11

[56] References Cited

U.S. PATENT DOCUMENTS 3,443,087  5/1969  Robieux et al. ............ 204/DIG. 11
3,478,204 11/1969  Brubaker et al. .............. 250/403 P

OTHER PUBLICATIONS

"Selective Two-Step (STS) Photoionization of Atoms and Photodissociation of Molecules by Laser Radiation", Ambartzumian et al., pp. 354–356, Feb. 1972, vol. 11, No. 2, Applied Optics 250-423p.

*Primary Examiner*—Bruce C. Anderson

*Attorney, Agent, or Firm*—Hubbell, Cohen, Stiefel & Gross

[57]  ABSTRACT

The invention relates to a process for the separation of one isotope from a mixture of isotopes, which comprises selectively exciting the desired isotope to an energy level at a distance dE below the ionization continuum by means of laser irradiation, said level dE being at such a distance beneath the ionization continuum that the excited atoms at this level can be ionized by irradiation with an infrared laser, irradiating the excited atoms with an infrared laser so as to ionize them selectively, and separating the ionized atoms by deposition on a desired substrate. According to a modification of the process the desired isotope is excited in two or more steps of laser irradiation to an energy level above the ionization level, the excited atoms are permitted to decay by autoionization so as to form ions of the desired isotope, and these are collected. The invention further relates to a novel device for effecting the process comprising a vacuum furnace provided with a container for the isotope mixture, means for heating same so as to obtain the element in the form of atoms, means for selectively irradiating the desired isotope in a number of steps and means for selectively depositing the ions on a substrate.

8 Claims, 2 Drawing Figures

ISOTOPE SEPARATION

BACKGROUND OF THE INVENTION

1. Field of the Invention

The invention relates to a process of isotope separation, and more particularly to a process of isotope separation by selective excitation and ionization. It further relates to a device for carrying out this process.

2. Description of the Prior Art

Various processes of isotope separation are known. Some of these are used on a commercial scale. Amongst the most well known processes there may be mentioned the process based on diffusion, which is used mainly for the separation of the isotopes of uranium. The plant for such a process is quite expensive and only few such plants exist. A further process is based on the use of gas centrifuges. This seems to have reached the industrial stage, but it is mechanically quite complicated. Other methods have been suggested, such as the separation of a stream of gaseous uranium hexafluoride by means of special nozzles which bring about the separation of the heavier from the lighter isotopes.

During the second world war and after it, attempt were made to develop a photochemical process of isotope separation. This was not feasible, as no suitable sources of radiation were available. There has also been a suggestion to separate isotopes of uranium by irradiating uranium compounds in the molecular form. Suitable excitation of compounds in the form of molecules does not seem to be feasible.

During recent years the method of isotope separation based on the use of tunable laser light has received considerable attantion. This has been the case especially since tunable laser light has become available by the development of the dye laser. In spite of this it seems that no such method has been brought to the production stage. The proposed methods seem to be of quite low yields, and thus it seems that these are not commercially competitive with existing methods of isotope separation.

As nuclear industry relies on the ready availability of separated or enriched isotopes of uranium and also of hydrogen, and as also other fields of scientific activity, such as biological research use various isotopes, such as those of hydrogen, carbon, iron, etc., there is room for an improved and simple method of isotope separation which is applicable to small quantities of separated isotopes, yet which is also capable to separate quite large quantities of isotopes, as are needed for other uses.

DESCRIPTION OF THE PRESENT INVENTION

According to the present invention there is provided an improved process of isotope separation by selective excitation and ionization which overcomes the drawbacks of the proposed processes based on the same principles, and which results in a high degree of purity of the desired and obtained isotope and in substantially increased yields and correspondingly lower costs of production. The present invention is applicable to the separation of isotopes of an element having two or more isotopes. In the following the case of separation of U-235 from U-238 is dealt with, but it is to be clearly understood that this is by way of example only and that other isotopes may be separated by the same process or by a modification thereof.

The novel process of isotope separation comprises five steps, namely:

a. Atomization: in this step the initial material is converted into the gaseous form, so as to have available separate atoms. This is readily accomplished by heating to an elevated temperature, by bombardment of molecules with electrons or by any other conventional method. It is clear that this step is necessary only with elements which do not occur in nature as separate atoms, such as for example the noble gases, with which this step may of course be omitted.

b. Irradiation: As different isotopes have slightly different spectral lines, it is possible to bring about the selective excitation of one isotope by irradiation of the gaseous atoms by means of irradiation of a preselected wavelength of narrow band width. Such irradiation iteracts in a resonative manner with the desired isotope, and with the isotope only, and thus the atoms of this isotope are obtained in an excited state, while atoms of a different isotope or isotopes remain in the unexcited state.

c. Further irradiation: A further, or further steps of irradiation are resorted to in order to further excite selectively the already excited atoms and to raise them to a level close to the ionization continuum, at least close enough so as to enable the excited atoms to be ionized by means of irradiation from a suitable infrared laser, such as a $CO_2$-laser.

d. Ionization: the excited atoms are irradiated with light of a suitable wave-length and frequency, which is energetic enough to ionize the excited atoms, but which will not, or only negligibly, excite the unenergized atoms of the other isotope-;

e. Collection: the ionized atoms are collected. This may be done by the application of a suitable electrical field, which will effect only the ionized atoms and not the unionized ones.

According to the present invention the desired isotope is selectively brought close to the ionization level by resorting to one or more intermediate steps of energization, prior to their ionization.

The excitation, or these further excitations, are effected by means of laser light of a tunable laser, such as for example a dye laer of adequate output and of well-defined and narrow band width of its emitted radiation. The excitation (or excitations) are or is effected in such manner as to fit a transition of the appropriate atoms to a higher level, so as to bring the excited atoms into a region close to the ionization continuum. This is possible for such atoms, as it is known that such levels exist (these are known as Rydberg levels). The final level to which the atoms are raised prior to ionization is chosen in such manner as to be within an energy interval dE from the ionization continuum of the atom, so that dE is the energy transferred by a photon of a high power laser, such as a $CO_2$-laser.

Amongst the advantages of this improved process, the following ought to be stressed:

a. the photoionization is effected by means of a high-power laser, which provides a supply of an adequate number of photons which are adapted to ionize the pre-energized atoms;

b. the cross sections for photoionization are usually quite small, of the order of $10^{-18}$ $cm^2$. On the other hand, cross-sections for Rydberg level photoionization can attain quite high values up to $5 \cdot 10^{-17}$ $cm^2$.

After ionization, the ionized atoms of the desired isotope are collected.

Also in this respective there is provided an improvement. Hitherto it has been suggested that this collection be effected by a combination of magnetic and electrical fields. However, magnetic fields are not appropriate as they bring about the well-known Zeeman effect of splitting of spectral lines. Inhomogeneities of the magnetic field bring about an effective broadening of the lines and this may bring about an overlap of the lines of the various isotopes. Such overlap is in conflict with the basic principles of the selective excitation.

Also the use of a pulsed magnetic field is not possible, as induction effects and magnetic diffusion time make this impracticable.

According to the present invention the ionized atoms are selectively removed by the applications of an electric field, adapted to overcome the sum of the electron removal barrier and the charge exchange barrier.

When a voltage V is applied across two metallic plates on the two sides of a "gas slab" of thickness L, said ionized gas containing n ions and n electrons per unit of volume, all the electrons will be collected on the positively charged plate even if the ions are too heavy to be moved by the field. In practice the electrons are collected rapidly with respect to the collection time of the ions only if V/L 4 ne, is termed "electron removal barrier". If this condition is not met, the electrons are collected only to a partial degree, the electrical field over part of the gas will be shielded and the further collection proceeds at the rate of ion motion. This drop in electric field is harmful as some of the ions are not immediately accelerated by an electric field and will be lost by the phenomenon of "charge exchange".

When ions are collected by an electric field applied to the plates which border a slab of ionized gas of n ions and N neutral atoms, the ions move through the gas and there may be an exchange of ionization between the ions and the neutral atoms along the path. This results in an ionization of the atoms of the wrong isotope, resulting in a contaminated product. If the accelerating potential is adequately high, the ions attain a sufficiently high velocity and the charge exchange cross-section becomes small. A charge exchange barrier can be defined for a given voltage. It is calculated according to Nebenzahl: J.Chem. Phys. 54 (1971), 5254 and it is given to a good approximation by $$\delta_{ex} = (2 - 0.2 \ln E) \cdot 10^{-14} \text{ cm}^2$$

where E is the ion energy in KeV. The probability of charge exchange prior to collection is $$p = 2 \cdot 10^{-14} \text{ cm}^2 N \cdot 1 (1.15 - 0.1 \ln V)$$

V has to be in the KeV region so that p will be small and N1 as large as possible. The application of an electric field across the plates, bordering the ionized gas, with a voltage exceeding these two barriers, results in an effective separation of the ionized isotope and avoids the necessity of application of a magnetic field.

As neither N or 1 can be made as large as we wish without increasing p, and as p defines the purity of the product which is $$1/(1-p)$$

And as the yield is proportional to N·1, it is evident that the yield cannot be increased beyond a certain limit, even if the oven and lasers are adapted to deal with high fluxes of atoms. This can be overcome to a certain extent and a better yield can be attained by resorting to a plurality of collecting plates of alternating electrical charge. Thus the path of each ion is reduced and the yield of the separation plant is increased in proportion to the number of beams emanating from the oven. This makes it possible to utilize the full capacity of the furnace and of the laser system without increasing the probability of charge exchange which is apt to decrease the purity of the product.

When it is intended to separate uranium into its 235 and 238 isotopes (which means actually to separate the lighter isotope 235, which constitutes a small proportion, of about 0.72% of the other) the uranium metal is first heated in a suitable furnace to a high enough temperature so as to attain an adequate vapor pressure. Such a temperature is about 2150° C. At this temperature about half of the atoms are at a slightly excited state (620 cm$^{-1}$), and the atoms emerging from the furnace are irradiated with the irradiation of one laser to raise their energy level to a predetermined level, and with another laser so as to raise the atoms which are at the 620 cm$^{-1}$ level to the same level; simultaneously, or with a very brief interval, the atoms excited to the intermediate level "A" are irradiated with another laser so to raise their energy to a level "B" slightly below the ionization continuum, the difference from this level being such that irradiation, with an infrared laser will bring about the ionization of the excited atoms from level "B".

It is also possible to use a single laser (tunable dye-laser) of adequate energy to raise the energy level of the atoms directly to level "B" and to irradiate them directly at this level with an infrared laser and to ionize them. The direct excitation to the "B" level can be effected with the second harmonic of a tunable dye laser.

The present invention is thus defined as to encompass any process wherein atoms of the desired isotope are selectively excited, in one or more steps, so as to raise them to a level at a distance dE beneath the ionization continuum, this being at such distance from the continuum that the excited atoms can be selectively ionized by means of irradiation from a $CO_2$-laser or similar laser.

The following example is intended to illustrate the invention, and is to be construed in a non-limitative manner.

Uranium metal was heated in a vacuum furnace of 100 cm length and 4 cm width so that the temperature of the uranium at the surface in themiddle of the molten metal was about 2150° C. The heating was effected by means of an electric current passed through the metal. The rate of evaporation at this temperature was about 20 kg. of metal per 24 hours of operation.

At a height of about 10 cm above the surface of the metal there was arranged a collimator of about 1 cm width, along the length of 100 cm of the bath beneath. A second, similar collimater was arranged at a height of 20 cm above the metal. The collimators are maintained at a temperature of about 1250° C., which is above the melting point of the metal, so that metal will not adhere to them and flow back. As a small proportion of the atoms emerging are ionized (due to the high temperature), the collimators are maintained at a voltage of +10 V so as to eliminate these ions. A quantity of about 1.1–1.2 kg natural uranium passes through the collimators in the form of atoms.

The system, which comprises the furnace, the collimators, collectors for the desired isotope and a drum for collecting the U-238 is maintained at a pressure of $10^{-4}$ mm Hg. of argon (which is purified of any reactive gases) and which is introduced near the windows, and which is passed over these which are located at a distance of about 60 cm form the oven and flows towards the center of the oven. Between the furnace and the windows there are arranged a number a baffles, provided with openings for the light beams. These arrangements are provided in order to minimize the deposition of uranium on the windows. The windows, which are of a size of 15 cm height × 1.5 cm width, are coated with a coating which does not reflect at 4000 Å and at 10.6μ. The windows are arranged at the ends of a conduit of 20 cm × 20 cm and of a length of 50 cm. along which there are arranged 5 baffles. The windows are of sodium chloride.

The atoms of uranium emerging through the upper collimator are illuminated by means of three lasers, each of these having a beam of 1 cm width, 0.5 cm height and a horizontal widening of $2 \cdot 10^{-4}$ and in the vertical direction of $5 \cdot 10^{-4}$ radian. The beam passes through the atoms 20 times, due to the provision of two parallel mirrors coated with a dielectric coating of 99 percent reflexion at 10.6μ and at 4000 Å. The beam is beamed at an angle onto the first mirror and passes hence and forth between the mirrors.

The first laser is a tunable dye laser, with a radiation in the vicinity of 24,000 $cm^{-1}$. The band width of the laser is about 0.02 $cm^{-1}$, its peak output 10 KW, pulse duration 7 n.sec, and frequency of pulses 10,000 per second.

The second laser is a laser similar to the first one and which is tunable in the vicinity of 25000 $cm^{-1}$. By means of this laser, the atoms excited by the first laser are raised to a level slightly below the ionization level, and preferably to a level of about 900 $cm^{-1}$ beneath the ionization level.

The third laser is a $CO_2$-laser of a wavelength of 10.6 and this brings about an ionization of the excited U-235 atoms, and only of these. Its output is 50 KW, duration of the pulse 100 n.sec. 10,000 pulses per second.

The ionized U-235 atoms are collected on a collector with the aid of an electric potential of 10 KW. They are collected on parallel plates arranged along the entire length of the oven, above and parallel to the upper collimator. These are arranged 5 cm above the upper collimator, and their dimensions are 110 cm length, 12 cm height and at a distance of 4 cm from each other. In order to avoid a widening of the band width due to the Stark effect, the potential is applied to the collector plates only 150 n sec. after the laser pulses, and only during 10 μsec. This duration of time is adequate for a collection of all the ions.

The collected U-235 is dissolved in a suitable mineral acid and recovered. A separation of about 7 g U-235 is attained per 24 hours, degree of purity about 60%.

A modification of the above process increases the output nearly by a factor of two: Due to the high temperature part of the atoms (about 45%) is at the basic level, whereas about 45% are at a level of 620 $cm^{-1}$. Thus it is advantageous to use two different tunable dye lasers, operating at a difference of 620 $cm^{-1}$, so as to raise all the atoms of both the basic level and of the 620 $cm^{-1}$ level to the intermediate level "A", and to raise them from there to level "B", as set out above.

A further modification of the process comprises illuminating the atoms of uranium with one (or two) tunable dye lasers (second harmonic of a dye laser) so as to raise the atoms directly from the basic level, or from basic level and level 620 $cm^{-1}$, to a level slightly beneath the ionization continuum, and to use another laser, such as $CO_2$-laser in order to selectively ionize these excited atoms of U-235. It is clear that also in this case the band width of the laser has to be narrow eneought so as to selectively excite the atoms of U-235, without exciting the atoms of U-238.

Due to the comparative simplicity of the device and as the energy requirements of the process are not large, the process of the invention is an economical one. Substantially pure U-235 can be obtained in one or two stages of such process.

The U-238 can be collected and removed or it can be returned—all or part of it—to the heating oven.

According to a modification of the process of the invention the atoms are excited by two or more steps to a autoionization level. This is accomplished by means of tuned dye lasers. After a very brief period of time, of the order of nanoseconds, each of the thus excited atoms emits an electron and there is obtained an ion which is collected.

The advantage of this modification is that the cross section for autoionization is much higher than that for conventional photoionization, so that a laser of considerably less power is required for the last stage of the ionization.

Cross sections are of the order of $10^{-14} cm^2$ instead of about $10^{-17}$ to $10^{-18} cm^2$.

An example of a device for carrying out the process of the present invention is exemplified with reference to the annexed schematical drawings, in which.

Figure 1:
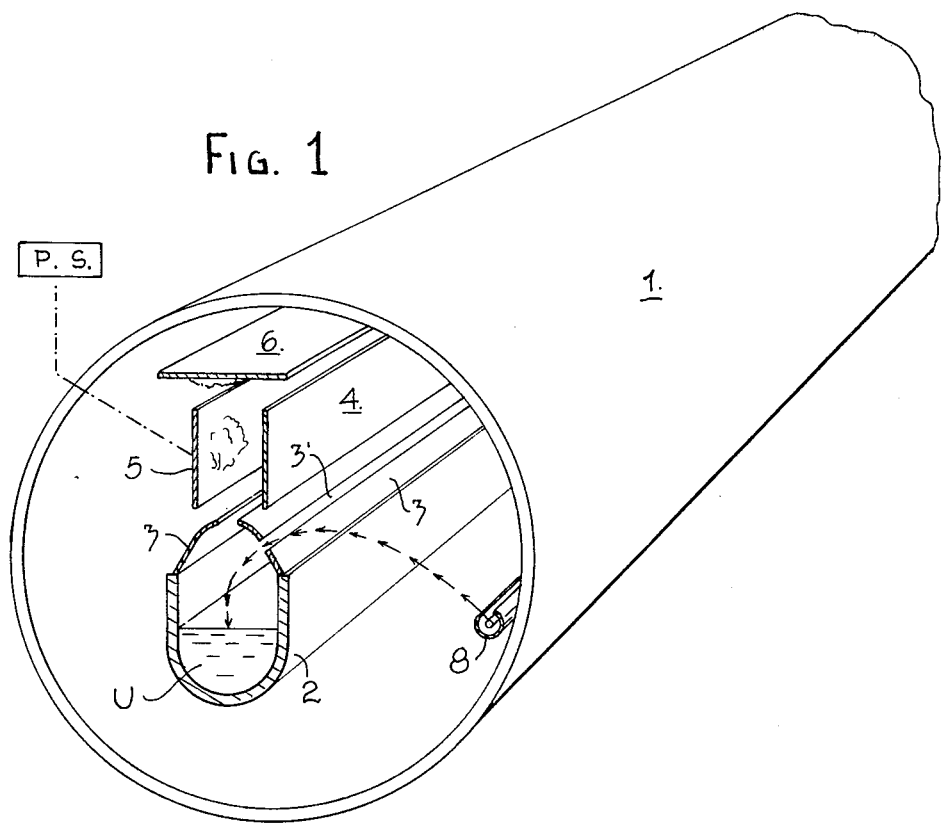
FIG. 1 is a schematical perspective view in partial section of part of the device.
Figure 2:
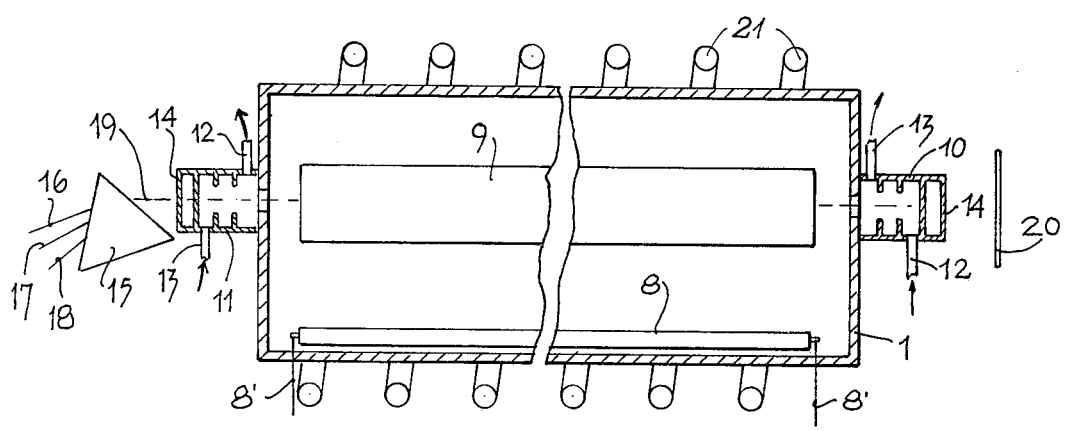
FIG. 2 is an axial section of the vacuum furnace of FIG. 1.

In the drawings the numeral 1 indicates the casing of the furnace. In the said casing 1 there is provided a thoria-coated graphite, an alumina or a magnesia curcible 2, in which there is contained a quantity of liquid uranium U. Above the crucible 2, there are provided collimating plates 3. Above the collimating plates 3, in vertical planes, there are provided the metal plate 4 and the second metal plate 5, which serves as collector for the separated isotope. On top of this arrangement, there is provided the horizontal plate 6, which serves as collector of the isotope U-238. The numeral 8 indicates an electron source, the electrons being deflected by the effect of the coil 21 in such manner as to enter the narrow slit 3' of the one baffle plate 3, so as to strike at about the median line of the upper surface of the uranium U. The electrical connections of the electron source, of the collecting plate 5 are not shown. In FIG. 2, 1 indicates the casing of the vacuum furnace, numeral 8 the electron source connected via leads 8' to a power source and 9 the crucible and the parts arranged above same. At both ends of the casing 1 there are provided tubular extensions 10 and 11, respectively, each of these being provided with an inlet 12 for an inert gas, such as argon, and an outlet 13, connected to a vacuum pump which maintains the flow of the argon gas so as to prevent any deposition of uranium on the windows, and which also maintains the necessary vacuum in the vacuum furnace, and with windows 14. At the one end there is provided a prism 15, positioned at such an angle that the beams 16,17 and 18, of varying wave lengths, emanating from the different lasers, are introduced into the furnace along the optical axis 19. The beams 16, 17 and 18 are reflected by the mirror 20, located at the other end and thus pass repeatedly between this mirror and the respective lasers, thus traversing repeatedly the space between the plates 4,5 and 6. The exact mode of operation of the device is set out above, in the detailed description in this specification.

We claim:

1. A process for the separation of one isotope from a mixture of isotopes in atomic form which comprises selectively exciting the desired isotope to an energy level at a distance dE below the ionization continuum by means of laser irradiation, said level dE being at such a distance beneath the ionization continuum that the excited atoms at this level can be ionized by means of irradiation of an infrared laser; irradiating the excited atoms with an infrared laser so as to ionize them selectively, and separating the ionized atoms by deposition on a desired substrate.

2. A process as claimed in claim 1, wherein the excitation to the level dE beneath the ionization level is effected in one step by means of the second harmonic of a tunable dye laser.

3. A process as claimed in claim 1, wherein the atoms of the desired element are obtained by heating.

4. A process as claimed in claim 3, wherein the ions formed by the heating are eliminated prior to the excitation of the atoms by laser irradiation.

5. A process as claimed in claim 3, wherein a combination of lasers is used in order to raise atoms, both from ground level and from a level above this level, due to heat energy, to the desired level of excitation.

6. A process as claimed in claim 3, wherein the element is uranium and the separated isotope is U-235.

7. A process as claimed in claim 6, wherein atoms are excited both from ground level and from a level of about 620 $cm^{-1}$ to a predetermined level beneath the ionization continuum, and are ionized from this level by irradiation with a $CO_2$ laser.

8. A process for the separation of one isotope from a mixture of isotopes, which comprises selectively exciting in at least two steps the desired isotope in atomic form to an energy level by I.R. laser radiation above the ionization level, permitting the excited atoms to decay by autoionization so as to form ions of the isotope which is to be separated, and collecting these.

* * * * *